United States Patent [19]

Chandick et al.

[11] 4,281,849
[45] Aug. 4, 1981

[54] PORTABLE LUGGAGE CARRIER AND METHOD OF COLLAPSING SAME

[75] Inventors: Michael D. Chandick; Robert M. Chandick, both of Orland Park; Pasquale Ricchio, Blue Island, all of Ill.

[73] Assignee: Miro Manufacturing Company, Blue Island, Ill.

[21] Appl. No.: 64,816

[22] Filed: Aug. 8, 1979

[51] Int. Cl.³ ............................................... B62B 1/20
[52] U.S. Cl. ..................................... 280/655; 280/652; 294/167
[58] Field of Search ............... 280/655, 654, 653, 651, 280/639, 638; 224/45 W, 273, 320, 42.01, 42.08, 314, 45 R

[56] References Cited

U.S. PATENT DOCUMENTS

| 1,576,325 | 3/1926 | Hopf | 280/79.3 X |
|---|---|---|---|
| 2,569,118 | 9/1951 | Sherman | 280/47.18 |
| 2,784,004 | 3/1957 | Hamrick, Jr. | 280/47.17 X |
| 2,945,699 | 7/1960 | Berlye | 280/79.3 |
| 3,168,329 | 2/1965 | Goldschmidt | 280/645 |
| 3,215,401 | 11/1965 | Grabarski | 280/35 R |
| 3,232,502 | 2/1966 | Kleinbortas | 224/42.01 |
| 3,400,942 | 9/1968 | Hull | 280/35 X |
| 3,647,236 | 3/1972 | Hayes | 280/641 |
| 3,744,812 | 7/1973 | Langhausen | 280/35 |
| 3,827,707 | 8/1974 | Bierman | 280/654 |
| 3,861,695 | 1/1975 | Shourek et al. | 280/659 |
| 3,947,054 | 3/1976 | Hall | 280/47.29 X |
| 4,040,642 | 8/1977 | David | 280/654 |
| 4,062,565 | 12/1977 | Holtz | 280/655 |

FOREIGN PATENT DOCUMENTS 170531 10/1921 United Kingdom .
216249 5/1924 United Kingdom .

Primary Examiner—Joseph F. Peters, Jr.
Assistant Examiner—Milton L. Smith
Attorney, Agent, or Firm—Merriam, Marshall & Bicknell

[57] ABSTRACT

A portable and collapsible luggage carrier having an upright frame including a lower frame section and an upper frame section pivotally connected to the upper end of the lower frame section. Wheels are secured to the lower end of the lower frame section and the ends of legs of a U-shaped base frame are pivotally connected to the lower frame section so that the base frame is swingable between a generally horizontal, operative position and a generally vertical, inoperative position between the side portions of the lower frame section. A pair of U-shaped auxiliary support frames are pivotally connected to the legs of the base frame and an extension frame is shiftably mounted on each auxiliary support frame. When the base frame is in its operative position, the auxiliary support frames are engaged with the legs of the base frame and the extension frames are extended, the lateral stability of luggage supported on the carrier is substantially improved.

16 Claims, 10 Drawing Figures

FIG. 4
FIG. 5
FIG. 6
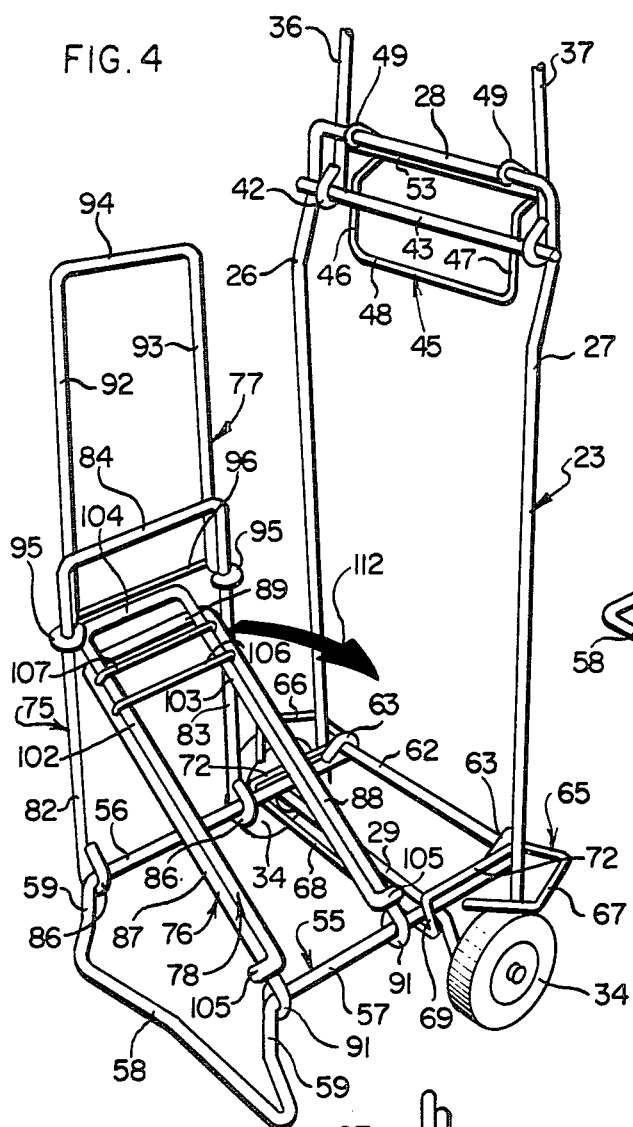
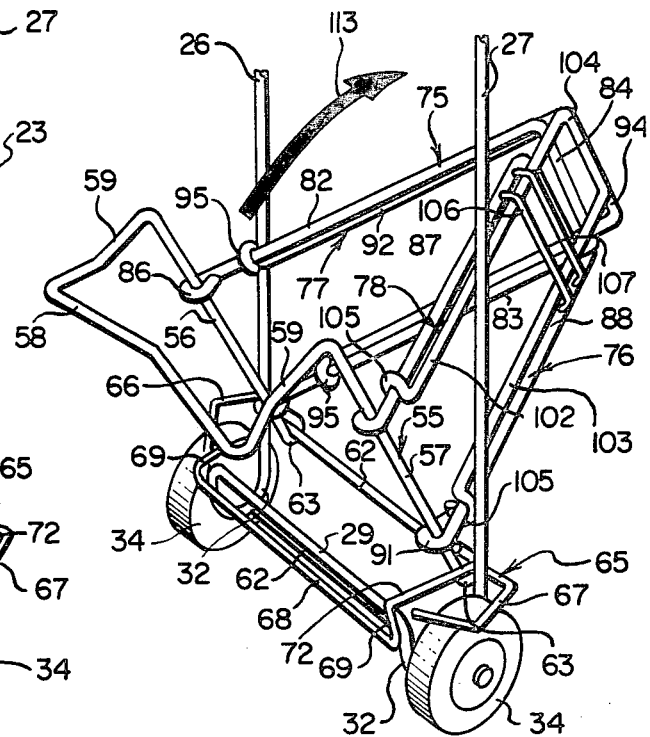
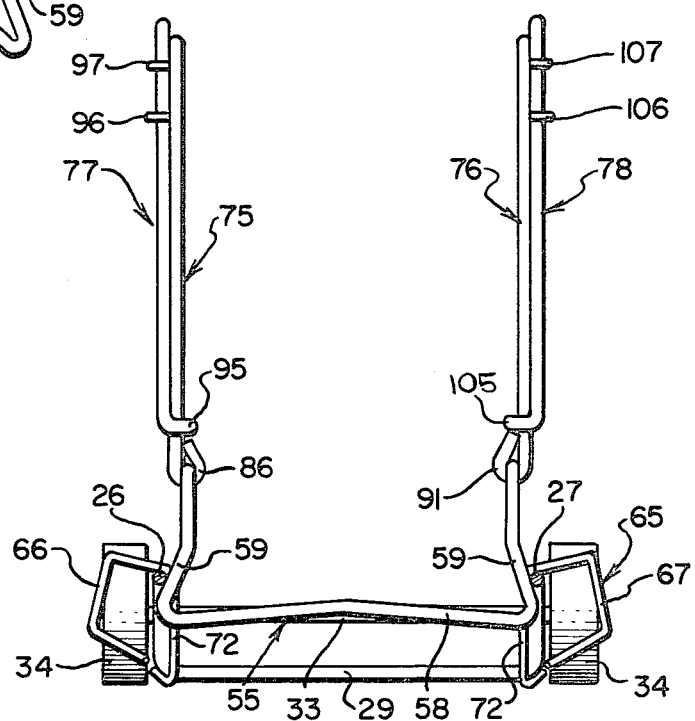

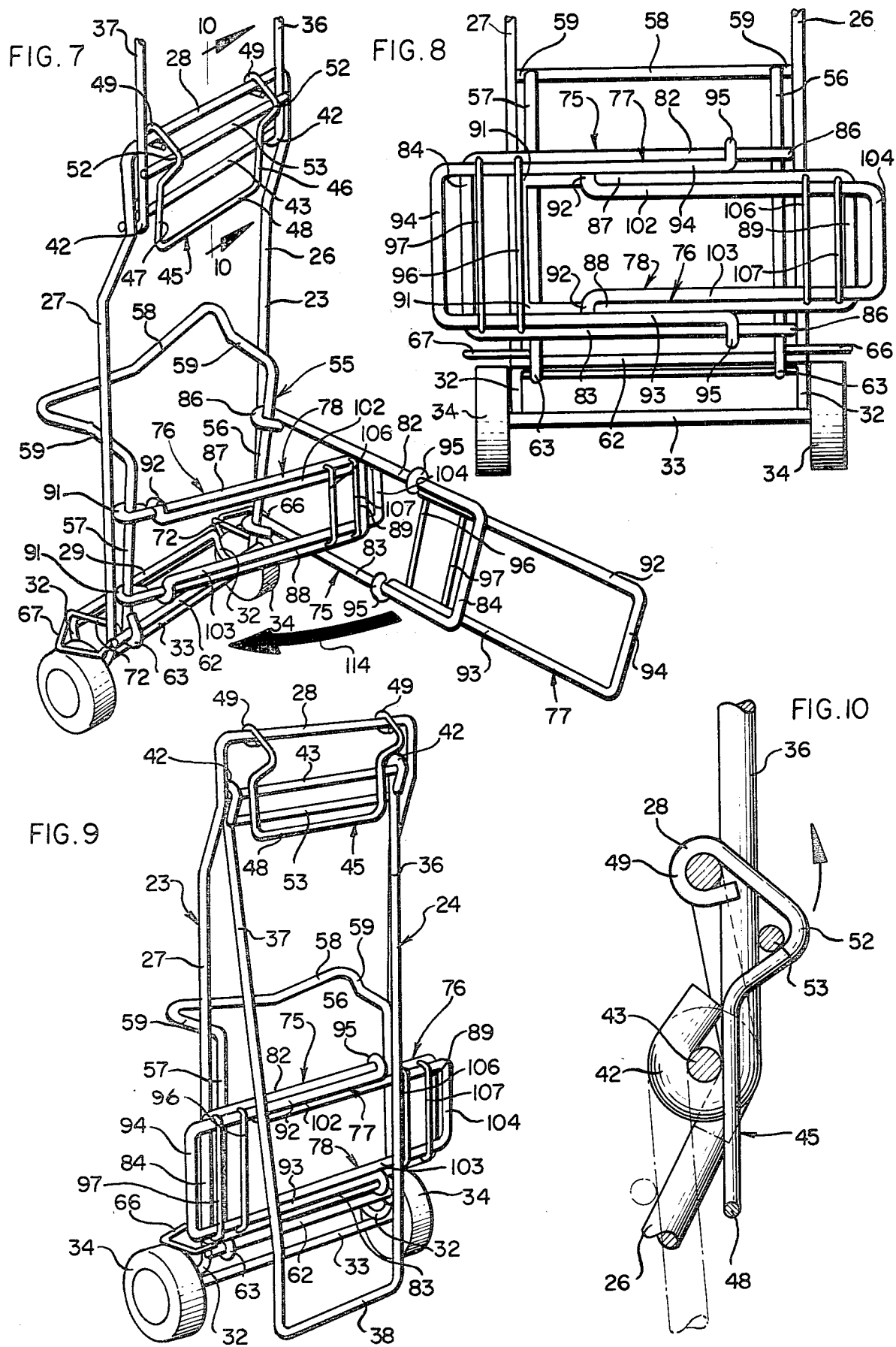

PORTABLE LUGGAGE CARRIER AND METHOD OF COLLAPSING SAME

This invention relates to portable and collapsible luggage carriers, and more particularly relates to a portable and collapsible luggage carrier which provides improved lateral support for luggage supported on the carrier.

BRIEF SUMMARY OF THE INVENTION

Briefly described, the present invention contemplates a portable and collapsible luggage carrier which provides improved lateral stability to luggage supported thereon when the carrier is in use i.e. either when the carrier is in motion or stationary. The carrier includes upright frame means having laterally spaced, vertically extending side portions, the upright frame means being formed in two sections so that the upper section can be pivoted toward the lower section to reduce the bulk of the carrier when the latter is not in use. Wheels are secured to the lower end of the lower section of the upright frame means and a U-shaped base frame member having a depending support or foot portion at the forward or outer end thereof is pivotally connected to the lower section of the upright frame means. A pair of U-shaped auxiliary support frame members are connected to the legs of the base frame member and a second pair of U-shaped extension frame members are respectively slidably connected to the legs of the auxiliary support frame members. Consequently, when the auxiliary support frame members are folded down into engagement with the forwardly extending legs of the U-shaped base frame members, the extension frame members may be extended to substantially increase the lateral width of the carrier and thereby provide improved lateral stability to an article or articles of luggage supported on the carrier.

The extension frame members telescope laterally inwardly on the auxiliary support frame members to reduce the lateral width of the carrier when the latter is not in use and the forwardly extending base frame member can be pivoted to an upright position between the side portions of the upright frame member to reduce the thickness of the carrier. The upper section of the upright frame can be folded downwardly toward the lower section to further compact the carrier when the latter is not in use.

BRIEF DESCRIPTION OF THE VIEWS OF THE DRAWING

FIGS. 4, 5, 6, 7 and 8 are a series of fragmentary perspective views showing the parts of the carrier in the positions they would occupy as the carrier is collapsed to an inoperative, compacted condition;

FIG. 9 is a perspective view showing the carrier in its fully collapsed, inoperative condition; and FIG. 10 is an enlarged, sectional view taken along the line 10—10 of FIG. 7.

DETAILED DESCRIPTION

Figure 1:
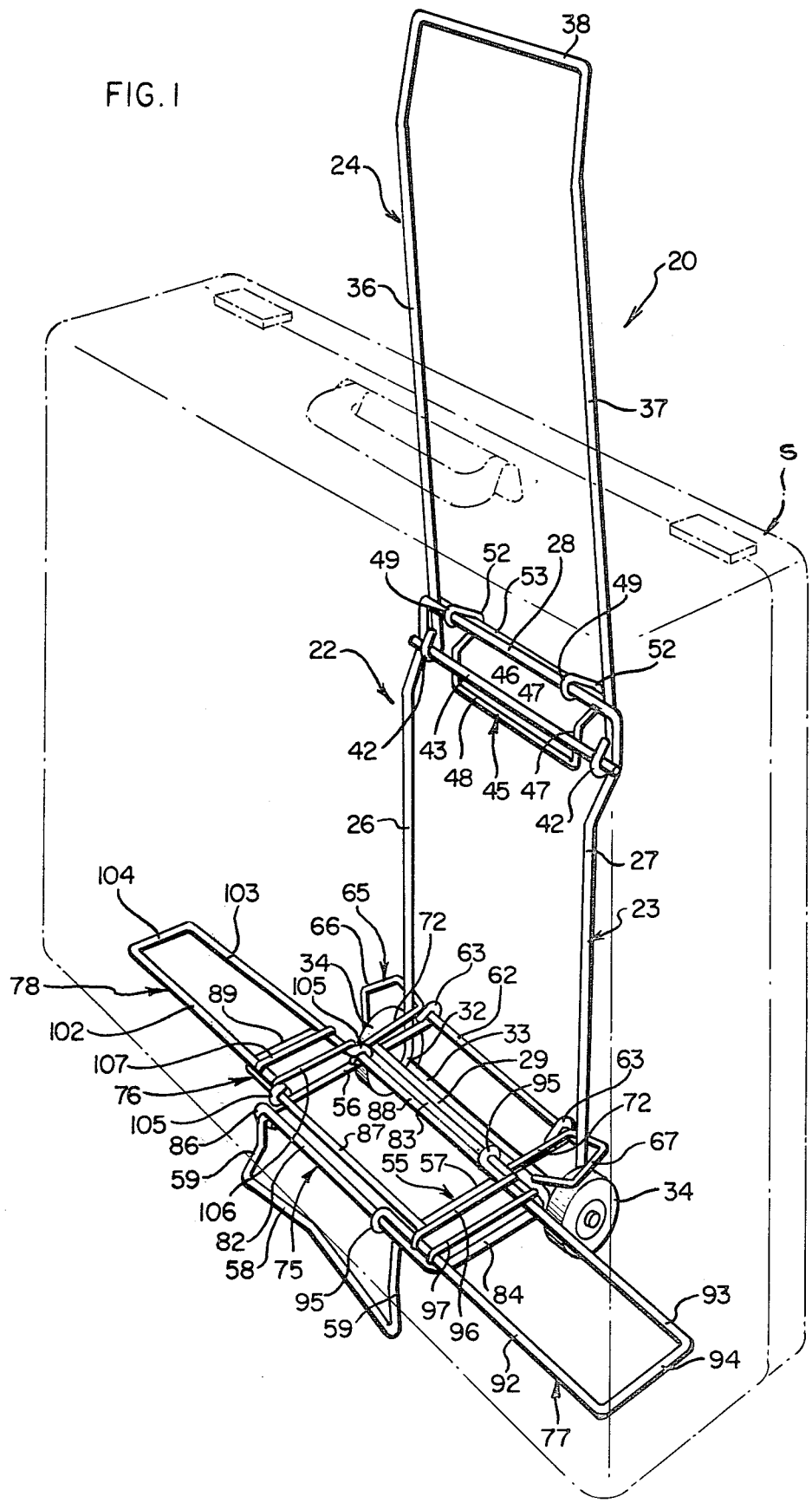
FIG. 1 is a perspective view of a portable and collapsible luggage carrier embodying the features of the present invention and showing the latter as it would appear when erected with the parts thereof in their operative positions.

In FIG. 1, a portable and collapsible luggage carrier embodying the features of the present invention is illustrated and indicated generally at 20. The parts of the carrier 20 are shown in FIG. 1 in the positions they would occupy when the carrier is in use and supporting an article of luggage, such as a suitcase S, shown in phantom lines.

Figure 2:
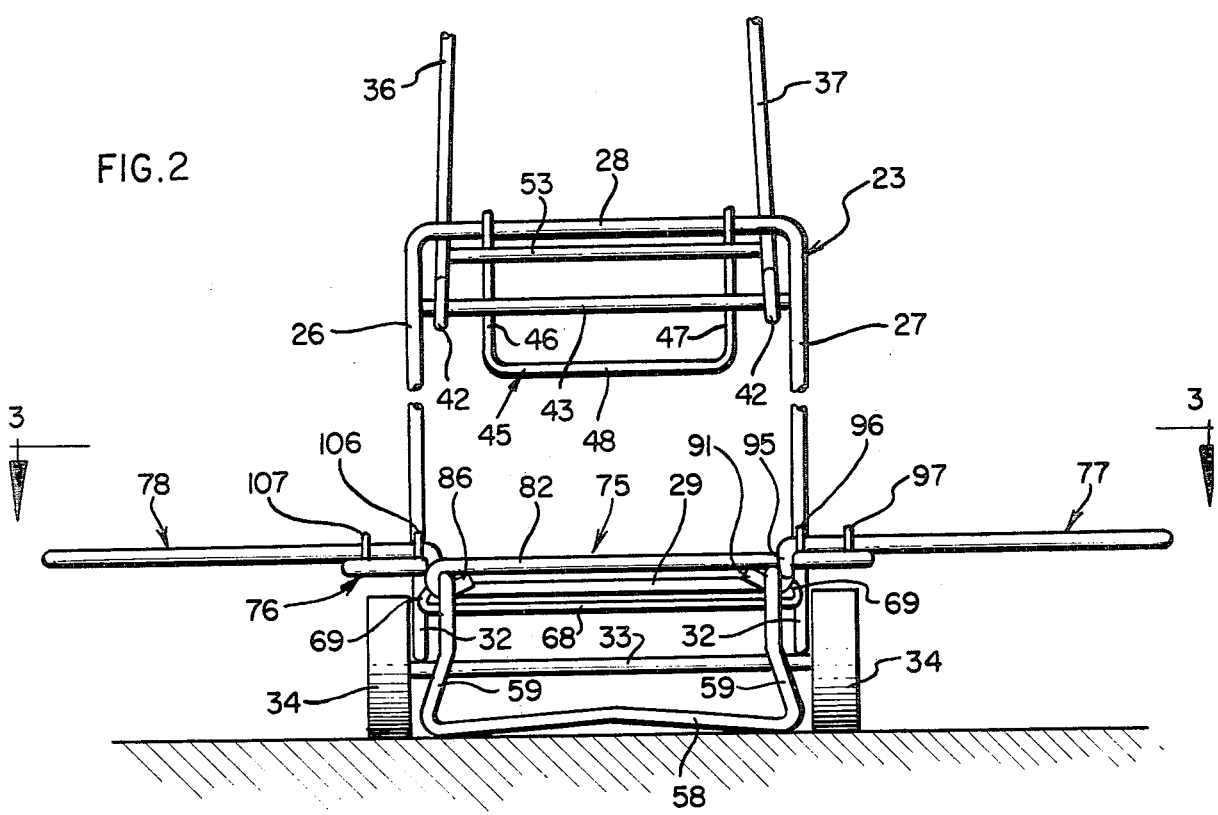
FIG. 2 is a fragmentary front elevational view, with intermediate portions thereof broken away for clarity of presentation, of the luggage carrier illustrated in FIG. 1.
Figure 3:
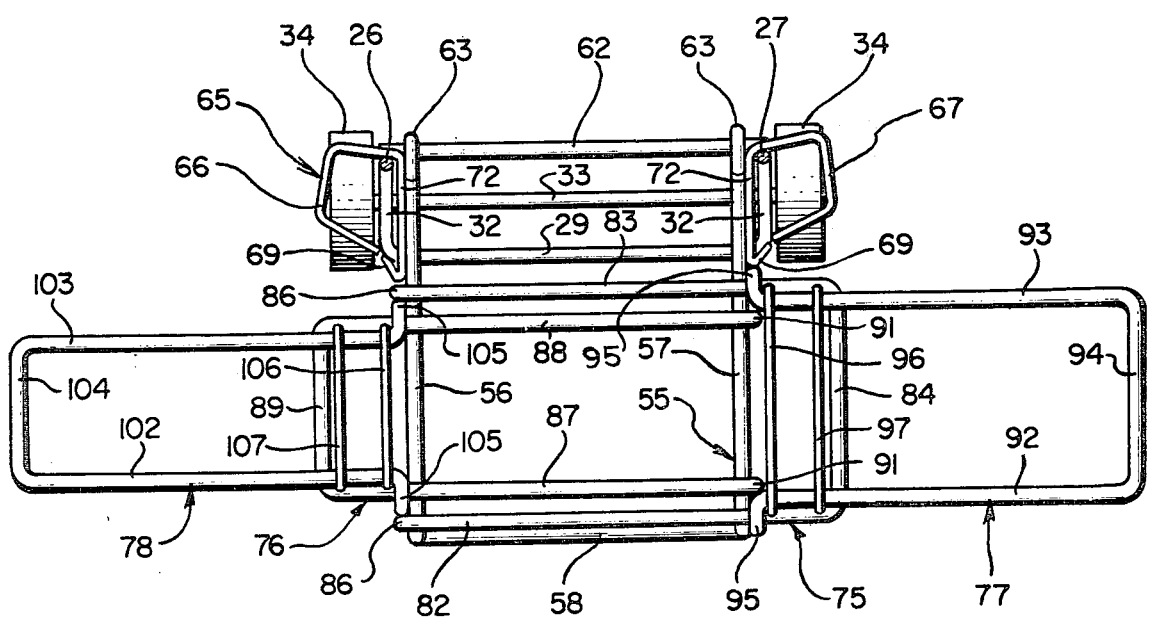
FIG. 3 is a horizontal sectional view taken substantially along the line 3—3 of FIG. 2.

Referring now to FIGS. 2 and 3 in conjunction with FIG. 1, it will be seen that the carrier 20 comprises upright frame means, indicated generally at 22, having a lower, generally rectangular section 23 and an upper, generally inverted U-shaped section 24. The lower frame section 23 includes a pair of laterally spaced, vertically extending side portions 26 and 27, a laterally extending connection portion 28 at the upper end of the frame section 23 and another laterally extending, connecting portion 29 at the lower end of the frame section 23 and spaced forwardly from the vertically extending, laterally spaced side portions 26 and 27 by semi-circular portions 32 best seen in FIG. 7. A laterally extending rod 33 is welded or otherwise secured to the underside of the semi-circular portions 32 and a pair of wheels, each indicated at 34, are secured to the outer ends of the rod 33.

The upper frame section 24 likewise includes a pair of vertically extending, laterally spaced side portions 36 and 37 and a connecting portion 38 which serves as a handle for the carrier 20 when the latter is in use. The lower ends of the side portions 36 and 37 are formed into loops 42 which encircle a laterally extending bar 43 that is welded or otherwise secured to the side portions 26 and 27 of the lower frame section 23, somewhat below the connecting portion 28. The side portions 36 and 37 extend behind the connecting portion 28 so that the upper frame section 24 swings rearwardly with respect to the lower frame section 23 as it is moved between its operative position illustrated in FIG. 1 and its inoperative position illustrated in FIG. 9.

Releasable locking means in the form of a bail 45 having a pair of laterally spaced, vertically extending legs 46 and 47 and a connecting portion 48, is pivotally connected by loops 49 bent around the laterally extending portion 28 of the lower frame section 23. The legs 46 and 47 of the bail 45 are formed with crimps 52 which coact with a laterally extending bar 53 welded or otherwise secured to the lower ends of the side portions 36 and 37 of the upper section 24 to hold the lower ends of the side portions 36 and 37 engaged with the connecting portion 28 when the bail 45 is swung downwardly to its locking position illustrated in FIGS. 1, 7 and 10. Thus, the crimps 52 of the bail 45 provide an overcenter or toggle-type linkage which releasably secures the upper and lower frame sections 24 and 23 of the frame 22 in their operative positions.

A generally U-shaped base or support frame member 55 having a pair of laterally spaced leg portions 56 and 57 and a connecting portion 58 is pivotally connected to a laterally extending crossbar 62 welded or otherwise secured to the lower ends of the side portions 26 and 27 of the lower frame section 23. The aforementioned pivotal connection is obtained by loops 63 at the ends of the leg portions 56 and 57, which extend around the crossbar 62. The crossbar 62 is connected to the side portions 26 and 27 so that the forwardly extending leg portions 56 and 57 of the support frame 55 are generally horizontal when the leg portions 56 and 57 engage the laterally extending connecting portion 29 of the lower frame section 23 and the connecting portion 58 of the frame 55 rests on a floor or other horizontal surface. To this end, portions, indicated at 59, of the frame 55 are bent downwardly and diverge outwardly so tht the connecting portion 58 is spaced below the plane of the legs 56 and 57 of the base frame member 55 and provides a forwardly displaced support or rest for supporting the frame 22 in an upright position when the carrier 20 is stationary and an article of luggage, such as the suitcase S, is mounted thereon.

In order to releasably retain the support frame 55 in its forwardly extended, luggage supporting position illustrated in FIGS. 1, 2 and 3, a resilient, wire frame 65 having laterally spaced loop portions 66 and 67 and a connecting bar portion 68 is connected to the connecting portion 29 of the lower frame section 23 by welding or otherwise securing the bar portion 68 to the connecting portion 29. The loops 66 and 67 are connected by intermediate, inclined portions 69 (FIG. 3) which permit forwardly and rearwardly extending portions 72 of the loops 66 and 67 to partially extend over the leg portions 56 and 57 of the frame 55 and hold the latter in its operative position illustrated in FIGS. 1, 2 and 4.

According to the present invention, the support frame 55 includes means for increasing the lateral width thereof when the carrier 20 is in operation and the support frame 55 is in its forwardly extended position in order to increase the lateral stability of luggage supported on the carrier when the latter is in use. Such means preferably comprises a pair of auxiliary support frames 75 and 76, which are generally U-shaped and respectively pivotally connected to the leg portions 56 and 57 of the frame 55. The aforementioned means also includes a pair of extension frames 77 and 78 which are connected to and slidably mounted on the auxiliary support frames 75 and 76.

As will be apparent from FIGS. 1, 3 and 4, the auxiliary support frame 75 includes a pair of laterally extending leg portions 82 and 83 and a connecting portion 84 which extends transversely to the leg portions 82 and 83. The ends of the leg portions 82 and 83 are formed into loops 86 which encircle the leg portion 56 of the frame 55. The auxiliary support frame 76 likewise includes a pair of laterally extending leg portions 87 and 88 and a connecting portion 89 which extends transversely to the leg portions 87 and 88. The ends of the leg portions 87 and 88 are formed into loops 91 which extend around and pivotally connect the frame 76 to the leg portion 57 of the frame 55. The transverse or forward and rearward spacing of the leg portions 87 and 88 of the auxiliary frame 76 is less than that of the leg portions 82 and 83 of the auxiliary frame so that the leg portions 87 and 88 are spaced from and lie between the leg portions 82 and 83.

The extension frame 77 includes a pair of laterally extending leg portions 92 and 93 and a connecting portion 94 which extends transversely to the leg portions 92 and 93. The laterally inner ends of the leg portions 92 and 93 are formed into loops 95, which are wrapped around the leg portions 82 and 83 of the auxiliary frame 75. Consequently, the extension frame 77 is laterally shiftable on the auxiliary frame 75. Combined guide and stop means in the form of a pair of laterally spaced crossbars 96 and 97 are welded or otherwise secured to the legs 82 and 83. The crossbars 96 and 97 guide lateral movement of the extension frame 77 with respect to the frame 75 and the crossbar 96 limits the amount of extension of the extension frame 77 when the loops 95 of the frame 77 engage this crossbar.

The extension frame 78 likewise includes a pair of laterally spaced leg portions 102 and 103 and a connecting portion 104 which extends transversely to the leg portions 102 and 103. The ends of the leg portions 102 and 103 are formed with loops 105 which encircle the leg portions 87 and 88 of the auxiliary frame 76 and permit lateral shifting of the extension frame 78 on the auxiliary frame 76. The transverse spacing of the leg portions 102 and 103 is such as will permit the leg portions 102 and 103 to slide between the leg portions 87 and 88 of the auxiliary frame 76.

The auxiliary frame 76 also includes combined guide and stop means in the form of a pair of crossbars 106 and 107, which extend transversely to and are welded or otherwise secured to the leg portions 87 and 88 of the frame 76. The crossbars 106 and 107 guide lateral movement of the extension frame 78 relative to the auxiliary frame 76 and the crossbar 106 limits the amount of extension of the extension frame 78 when the loops 105 of the frame 78 engage this crossbar.

OPERATION AND METHOD OF COLLAPSING THE LUGGAGE CARRIER 20

Assuming that the luggage carrier 20 is in its operating position illustrated in FIG. 1, and that an article of luggage, such as the suitcase S, is supported on the carrier, it will be apparent that the auxiliary support frames 75 and 76 and extension frames 77 and 78 substantially increase the width of the support frame 55 and thus substantially contribute to the stability of one or more items of luggage supported on the carrier. Consequently, there is less likelihood of the luggage falling off of the carrier when the latter is in use. One or more elastic straps (not shown) may be employed to hold the luggage engaged with the upright frame 22, in a well known manner. Such elastic straps may be connected to the depending portion 58 of the frame 55 and to either the vertically extending side portions 36 and 37 of the upper section 24 of the frame 22 or to the vertically extending side portions 26 and 27 of the lower section 23.

Assuming that the luggage carrier 20 has served its purpose and a user wishes to collapse the carrier so that it can be easily transported and/or stored in a compact, inoperative condition, the method of shifting the parts of the carrier from their operative positions illustrated in FIG. 1 to effect such collapsing is as follows:

Initially, the auxiliary support frame 75 and extended extension frame 77 are swung to a substantially upright position, as illustrated in FIG. 4. While the extension frame 77 is maintained in its extended position, the extension frame 78 is telescoped or shifted inwardly on its auxiliary support frame 76 and the frames 76 and 78 are then swung in the direction of the arrow 112 in FIG. 4 toward an upright position until the connecting portion 104 of the extension frame 78 clears the crossbar 96 of the auxiliary support frame 75. The extension frame 77 is then shifted downwardly on auxiliary frame 77 to its retracted position.

After both extension frames 77 and 78 are fully retracted, the auxiliary support frames 75 and 76 are swung toward each other until the upper ends of the frames are close to or in contact with each other, as illustrated in FIG. 5. The frames 75,77 and 76,78, and base frame 55, are then swung upwardly and rearwardly about the pivot axis of the base frame 55 in the direction of the arrow, indicated at 113 in FIG. 5, between the side portions 26 and 27 of the lower frame section 23 until the diverging portions 59 of the frame 55 engage the side portions 26 and 27 of the lower section 23, as illustrated in FIG. 7. Initial upward movement of the frame 55 and connected frames 75,77 and 76,78 is resisted by the portions 72 of the resilient frame 65 since the portions 72 partially overlap the inner ends of the leg portions 56 and 57 of the frame 55 when the latter is in its forwardly extended operative position illustrated in FIGS. 1 and 4.

After the frames 75,77 and 76,78 have passed between the side portions 26 and 27 of the lower section 23 of the upright frame means 22, the extension frame 77 is shifted outwardly on its auxiliary support frame 75 to its extended position so that the auxiliary support frame 76 and retracted extension frame 78 can pass between the leg portions 82 and 83 of the auxiliary support frame 75. After the telescoped frames 76 and 78 have moved into engagement with the leg portion 56 of the base frame 55, the extension frame 77 is shifted inwardly on the auxiliary frame 75 to its retracted position and the telescoped frames 75 and 77 are then swung into engagement with the leg portion 57 of the base frame 55. Such movement is indicated by the arrow, indicated at 114 in FIG. 7. The aforementioned compacted or inoperative positions of the frames 55, 75,76 and 77,78 are illustrated in FIGS. 8 and 9. When in its inoperative position illustrated in FIGS. 8 and 9, the base frame 55 is disposed in a generally vertical position.

After the frames 75,76 and 77,78 are in their nested compact positions illustrated in FIG. 8, the connecting portion 48 (FIGS. 1 and 7) of the bail 45 is pulled rearwardly away from the crossbar 43 until the crimps 52 of the bail become disengaged from the laterally extending bar 53, which is secured to the lower ends of the side portions 36 and 37 of the upper section 24. The upper section 24 may then be pivoted downwardly toward the lower section 23 to the position thereof illustrated in FIG. 9. When so positioned, the carrier 20 is in its fully compact position suitable for transportation or storage until again needed. The components of the carrier 20 may be rapidly and easily moved to their operative positions illustrated in FIG. 1 by a reversal of the aforementioned steps.

It should be understood that the steps described in the foregoing method for collapsing the luggage carrier 20 could also be performed to collapse a luggage carrier which does not include the extension frames 77 and 78 if the steps pertaining to movements of the extension frames 77 and 78 were omitted. The latter method is, therefore, within the contemplation of the present invention as is a luggage carrier which includes the lateral support frames 75 and 76 but omits the extension frames 77 and 78.

It should also be understood that while the upright frame means 22 has been herein described as comprising the lower, generally rectangular section 23 and the upper, generally inverted U-shaped section 24, other structures could be utilized in place of the frame means 22, such as telescoping tubes and the like which can be releasably locked in different adjusted positions.

While only one embodiment of the invention has been herein illustrated and described in detail, it will be understood that modifications and variations thereof may be developed without departing from the spirit of the invention and the scope of the appended claims.

We claim:

1. A luggage carrier comprising an elongated, generally upright frame means having a laterally spaced, generally vertically extending side portions and laterally extending portions connecting the upper and lower ends of said side portions, a generally U-shaped base frame member having a pair of laterally spaced leg portions and a connecting portion, the ends of said leg portions being pivotally connected to the lower end of said upright frame means so that said base frame member is swingable between a generally vertical inoperative position adjacent to said upright frame means and an operative, generally horizontal position extending generally perpendicular to said upright frame means, and at least one auxiliary support frame pivotally connected to one of the laterally spaced leg portions of said base frame member, said auxiliary support frame having an operative position wherein a portion thereof extends laterally over and rests upon the opposite leg portion of said base frame member to which it is connected, whereby said auxiliary support frame provides additional lateral support to an article of luggage resting on the base frame member of said carrier when said base frame member and said auxiliary support frame are in their operative positions.

2. The luggage carrier of claim 1, in which a pair of said auxiliary support frames are respectively pivotally connected to the laterally spaced leg portions of said base frame member, and each of said auxiliary support frames has a portion extending laterally over and resting upon the leg portion of said base frame member opposite to the leg portion to which it is connected when said auxiliary support frames are in their operative positions.

3. The luggage carrier of claim 2, in which each of said auxiliary support frames is generally U-shaped and includes a pair of spaced, laterally extending leg portions and a connecting portion, and the length of the leg portions of each of said auxiliary support frames is such that at least the connecting portion of each auxiliary support frame extends beyond the opposite leg portion of the base frame member on which it rests.

4. The luggage carrier of claim 3, in which the transverse distance between the leg portions of one of said auxiliary support frames is less than the transverse distance between the leg portions of the other of said auxiliary support frames so that the leg portions of said one auxiliary support frame lie between the leg portions of said other auxiliary support frame when said auxiliary support frames are in their operative positions.

5. The luggage carrier of claim 4, in which an extension frame is slidably mounted on at least one of said auxiliary support frames, said extension frame being shiftable between a retracted, substantially congruent position with said auxiliary support frame and an extended position wherein said extension frame extends substantially beyond the connecting portion of said auxiliary support frame.

6. The luggage carrier of claim 5, in which an extension frame is slidably mounted on each of said auxiliary support frames and each of said extension frames is movable between said retracted and extended positions, said extension frames substantially increasing the length of said auxiliary support frames when said extension frames are in their extended positions.

7. The luggage carrier of claim 6, in which each of said extension frames is generally U-shaped and includes a pair of spaced, laterally extending leg portions and a connecting portion, and the transverse distance between the leg portions of said extension frames is less than the transverse distance between the leg portions of their respective auxiliary support frames.

8. The luggage carrier of claim 7, in which guide means is provided on each of said auxiliary support frames for guiding movement of said extension frames between their retracted and extended positions.

9. The luggage carrier of claim 8, in which said guide means comprises at least one crossbar extending transversely between the leg portions of each of said auxiliary support frames and secured to said leg portions adjacent to the connecting portions thereof.

10. The luggage carrier of claim 9, in which the ends of the leg portions of each of said extension frames are formed into loops encircling the leg portions of the auxiliary support frame on which said extension frame is mounted, said loops permitting said extension frames to slide on said auxiliary support frames, and said loops coact with one of the crossbars on each of said auxiliary support frames to limit laterally outward movement of said extensions relative to said auxiliary support frames.

11. The method of collapsing a luggage carrier to facilitate transportation and storage thereof when the latter is not in use, said luggage carrier including an elongated, upright frame having laterally spaced, vertically extending side portions and laterally extending portions connecting the upper and lower ends of said upright frame, a generally U-shaped base frame having the ends of the legs thereof pivotally connected to the lower, laterally extending portion of said upright frame so that said base frame pivots about a horizontal axis, the lateral spacing between the legs of said base frame being less than the lateral spacing between the vertical side portions of said upright frame, a pair of generally U-shaped auxiliary support frames having the ends of the legs thereof respectively pivotally connected to the laterally spaced legs of said base frame, the transverse distance between the legs of one of said auxiliary support frames being less than the transverse distance between the legs of the other of said auxiliary support frames when said auxiliary support frames are in their operative positions, and each of said auxiliary support frames extending over and resting upon the leg of said base frame opposite from the leg of the base frame to which it is pivotally connected, said method comprising the steps of swinging said auxiliary support frames to substantially upright positions, swinging said auxiliary support and base frames about the axis of said base frame toward the upright frame until the auxiliary support frames are disposed on the rear side of the upright frame and the legs of the base frame are disposed substantially between the side portions of the upright frame, and swinging the auxiliary support frames into engagement with the legs of the base frame.

12. The method of claim 11, in which said upright frame includes a lower section and an upper section pivotally connected to the upper end of said lower section, said method comprising the additional step of swinging the upper section rearwardly and downwardly into engagement with the auxiliary support frames after the latter are engaged with the rear sides of the side portions of the upright frame so as to hold the auxiliary support frames against said rear side portions.

13. The method of claim 11, in which generally U-shaped extension frames are slidably mounted on each of said auxiliary support frames and are shiftable between retracted and extended positions with respect to said auxiliary support frames, the transverse distance between the legs of one of said auxiliary support frames is less than the transverse distance between the leg portions of the other of said auxiliary support frames, the transverse distance between the legs of the extension frame on the other auxiliary support frame being less than the transverse distance between the legs of the one auxiliary support frame, and the lateral distance between the connecting portions of said extension frames is greater than the lateral spacing between the vertical side portions of said upright frame when said extension frames are retracted and said auxiliary support frames are in their operative positions, said method comprising the additional steps of swinging the other auxiliary support frame to a partially erect position while maintaining the extension frame thereon in its extended position, at least partially retracting the extension frame on the one auxiliary support frame, swinging the one auxiliary support frame and retracted extension frame toward an erect position until the auxiliary support and extension frames have passed between the legs of the extension frame on the other auxiliary support frame, and shifting the extension frame on the auxiliary support frame to its retracted position prior to swinging the base frame to the rearward side of the upright frame.

14. The method of claim 13, in which the length of the portion of the base frame which connects the legs thereof is greater than the lateral spacing between the vertically extending side portions of the upright frame, portions of the legs of the base frame adjacent to the connecting portion are bent downwardly and diverge outwardly from the legs toward the ends of the connecting portion so that the connecting portion is spaced below the plane of the legs of said base frame when the latter is in its extended, operative position, said method comprising the additional step of continuing swinging movement of the base frame toward the rear of the carrier after the legs of the base frame pass between the side portions of the upright frame until the outwardly diverging portions of the legs engage the side portions of the upright frame.

15. The method of claim 11, including the additional steps of shifting the extension frame on the other auxiliary support frame to its extended position, swinging the one auxiliary support frame and retracted extension frame between the legs of the auxiliary support frame and into engagement with the rear side of one of the side portions of the upright frame, shifting the extension frame on the other auxiliary support frame to its retracted position, and swinging the other auxiliary support frame and retracted extension frame into engagement with the rear side of the other side portion of the upright frame.

16. The method of claim 15, in which the upright frame includes a lower section and an upper section pivotally connected to the upper end of the lower section, said method comprising the additional step of swinging the upper section rearwardly and downwardly into engagement with the nested auxiliary support and extension frames so as to hold the frames engaged with the rear sides of the side portions of the upright frame.

* * * * *